United States Patent [19]

Kobayashi et al.

[11] Patent Number: 4,825,293

[45] Date of Patent: Apr. 25, 1989

[54] SENSITIVITY COMPENSATING METHOD FOR SOLID-STATE IMAGE PICKUP ELEMENT USED IN ELECTRONIC STILL CAMERA

[75] Inventors: Kiyotaka Kobayashi; Masatoshi Tabei; Madoka Arashi; Yuzo Mizobuchi, all of Kanagawa, Japan

[73] Assignee: Fuji Photo Film Co., Ltd., Kanagawa, Japan

[21] Appl. No.: 109,014

[22] Filed: Oct. 16, 1987

[30] Foreign Application Priority Data

Oct. 16, 1986 [JP] Japan ................................ 61-244033
Oct. 16, 1986 [JP] Japan ................................ 61-244036
Jan. 26, 1987 [JP] Japan ................................ 62-14247

[51] Int. Cl.$^4$ .......................................... H04N 5/235
[52] U.S. Cl. ................................ 358/228; 358/213.19
[58] Field of Search ................ 358/213.19, 909, 228, 358/211, 213.13

[56] References Cited

U.S. PATENT DOCUMENTS

4,695,891 9/1987 Peterson ...................... 358/213.13
4,739,409 4/1988 Baumeister ................... 358/213.19

Primary Examiner—Jin F. Ng
Assistant Examiner—Stephen Brinich
Attorney, Agent, or Firm—Sughrue, Mion, Zinn, Macpeak, and Seas

[57] ABSTRACT

A method for compensating changes which would otherwise be produced in a video output signal when the shutter speed exceeds a certain value, even though the same light level of the received image is maintained on the image pickup. In one embodiment, the shutter speed and/or aperture setting are adjusted to compensate. The amplification factor of the output video signal can also be adjusted. In other embodiments, gamma correction is effected separately for each primary color signal to compensate for the changes which affect the color signals in different amounts as the shutter speed is increased.

9 Claims, 7 Drawing Sheets

SENSITIVITY COMPENSATING METHOD FOR SOLID-STATE IMAGE PICKUP ELEMENT USED IN ELECTRONIC STILL CAMERA

BACKGROUND OF THE INVENTION

The present invention relates to a sensitivity compensating method for a solid-state image pickup element used in a camera such as an electronic still camera or a video camera. More particularly, the invention relates to such a method for compensating for the sensitivity of a solid-state image pickup element whose sensitivity drops as the shutter speed is increased, even if the exposure level of the image pickup element is maintained at a constant value by controlling the aperture setting or shutter speed.

Figure 1:
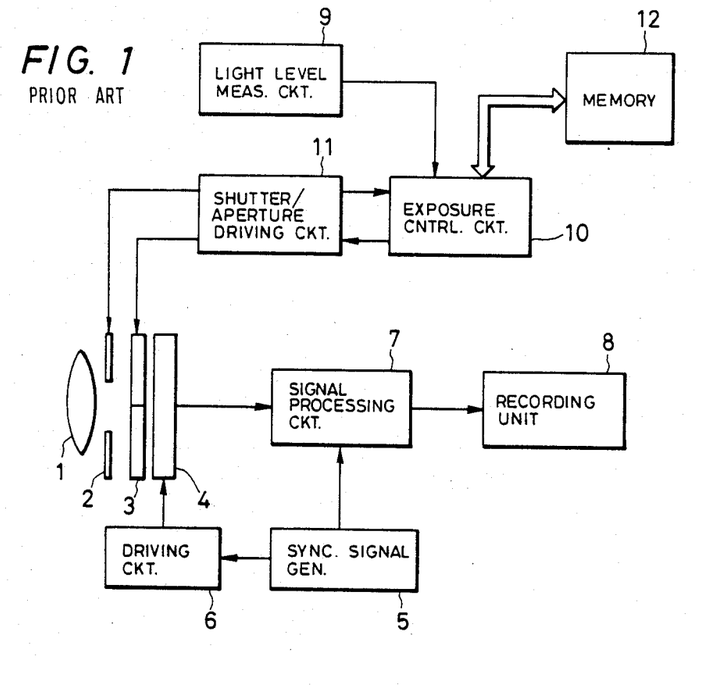
FIG. 1 is a block diagram showing the arrangement of a conventional electronic still camera.

A conventional electrical still camera is arranged as shown in FIG. 1. The optical image of a photographed object passes through a photographing lens 1, an aperture control iris 2, and a shutter 3, and is focused upon a CCD- or MOS-type solid-state image pickup element 4. In the image pickup element 4, the optical image of the object is subjected to photoelectric conversion on a pixel basis and an electrical signal is outputted therefrom.

A synchronizing signal generating circuit 5 generates various control signals used to control the operations of the electronic still camera. A driving circuit 6 connected to the synchronizing signal generating circuit 5 generates a driving signal applied to the image pickup element 4. Upon receipt of the driving signal, the image pickup element 4 outputs electrical signals with a predetermined timing on a pixel basis. Since color filters are provided on the image pickup element, color signals for each of red (R), green (G) and blue (B) are outputted from the image pickup element.

A signal processing circuit 7 receives the output of the image pickup element 4 and carries out preprocessing of the signals representative of R, G and B, and converts the signals into luminance signals and color-difference signals using a matrix circuit provided within the signal processing circuit 7. The output of the signal processing circuit 7 is supplied to a recording unit 8 in which the luminance signals and the color-difference signals are subjected to FM modulation. The modulated signals are recorded on a magnetic recording disk or the like.

A light measuring circuit 9 measures the amount of light received from the object before a photograph is taken and supplies the measured data to an exposure controlling circuit 10. A shutter/aperture driving circuit 11 controls the iris 2 and the shutter speed in response to an instruction received from the exposure controlling circuit 10 so that the amount of exposure of the image pickup element 4 is maintained at an optimum constant value.

A memory circuit 12, composed of semiconductor memory elements, such as a RAM or ROM, stores adjusting data for optimum stop aperture and shutter speed values with respect to the light level of the object as measured in the light measuring circuit 9. The optimum aperture setting and shutter speed are provided to maintain the exposure level at a constant value. More specifically, the exposure controlling circuit 10, supplied with the output of the light measuring circuit 9, determines the light level (illumination level) of the object based on this data. Adjusting data values for the aperture and the shutter speed corresponding to the light level of the object are read from the memory circuit 12 and then supplied to the shutter/aperture driving circuit 11 where the aperture setting and shutter speed are determined so that optimum exposure conditions are attained at the time of photographing.

In such an electronic still camera, both the aperture setting and the shutter speed are simultaneously adjusted in accordance with the amount of light being measured and also in accordance with whether priority is to be given to the aperture setting or to the shutter speed. In an electronic still camera having the abovedescribed arrangement, and particularly in such a camera using a solid-state image pickup element with a narrow range of acceptable exposure levels, it is most important to control the exposure level.

Although it may seem that ideal photographing conditions can be maintained if control is effected so that a constant amount of light strikes the image pickup element by adjusting the aperture setting and the shutter speed, a problem arises in practice in that the level of the electrical signal outputted from the image pickup element gradually drops as the shutter speed increases, even if the exposure level of the image pickup element is maintained at a constant value.

Figure 2A:
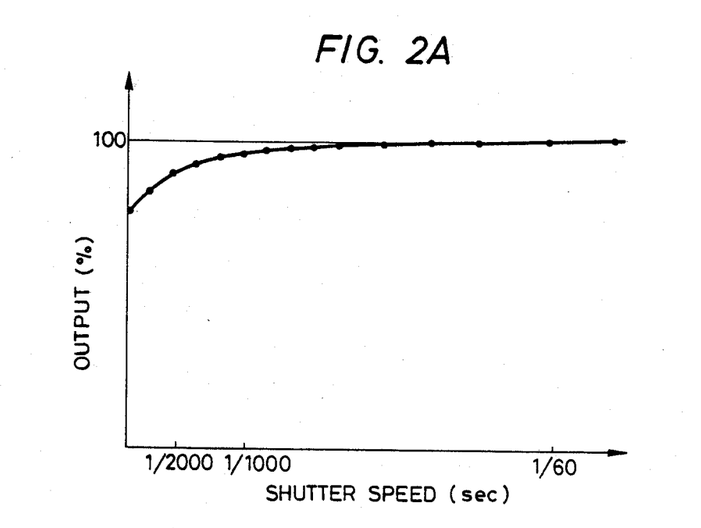
FIG. 2A shows a characteristic curve of a solid-state image pickup element relative to shutter speed.

FIG. 2A is a graph representing the relation between the output level of the image pickup element 4 and the shutter speed for a constant amount of light on the image pickup element. In this graph, the output level of the image pickup element 4 at a shutter speed of 1/60 seconds is normalized to 100%. According to the measured values as represented in the graph, the lowering of the output level of the image pickup element is not negligible when the shutter speed is faster than 1/1000 sec. This causes a degradation in the picture image in an electronic still camera using such an image pickup element.

Figure 2B:
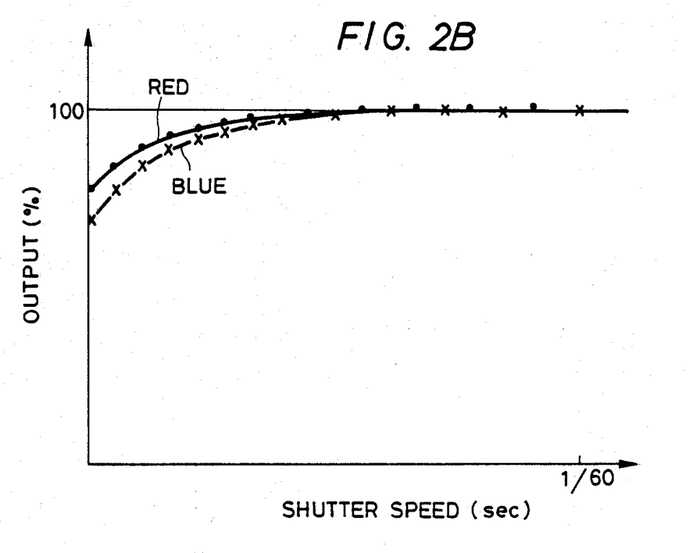
FIG. 2B shows hue characteristic curves of a solid-state image pickup element relative to shutter speed.

A further problem arises in that the signal level drop-off phenomenon dependent on shutter speed also occurs for each hue at a different ratio. FIG. 2B shows red and blue characteristic curves. When the shutter speed is faster than 1/000 sec, the drop of the signal levels for both red and blue become significant. This causes a loss of color balance, and thus a high quality picture image cannot be obtained.

SUMMARY OF THE INVENTION

The present invention has been made in view of the above-mentioned drawbacks.

It is an object of the invention to provide a sensitivity compensating method for a solid-state image pickup element in which the drop in the output level of the image pickup element which occurs as the shutter speed is increased is compensated fully.

It is another object of the invention to provide a sensitivity compensating method for a solid-state image pickup element which compensates for the difference among the various color signals.

In accordance with the present invention, the above objects are achieved by controlling the aperture setting (via control of the iris) or the shutter speed so that the drop in the sensitivity of image pickup element is compensated for by increasing the exposure level of the image pickup element by an amount corresponding to the amount of drop in the output level as the shutter speed is increased. Otherwise, the signal outputted by the image pickup element may be amplified by an amount corresponding to the drop in sensitivity of the image pickup element.

Further, in accordance with the present invention, there is provided an optical system which controls both the aperture setting and the shutter speed for solid-state image pickup elements, each carrying out photoelectric conversion for a respective hue in the optical image of the sensed object in which changes in the gamma of the image pickup elements are adjusted for each hue, whereby the changes in level of the respective hues are compensated for. Alternatively, the change in level of each hue can be compensated for by adjusting the amplitude and phase of a color carrier signal.

DESCRIPTION OF THE PREFERRED EMBODIMENTS

Figure 3A:
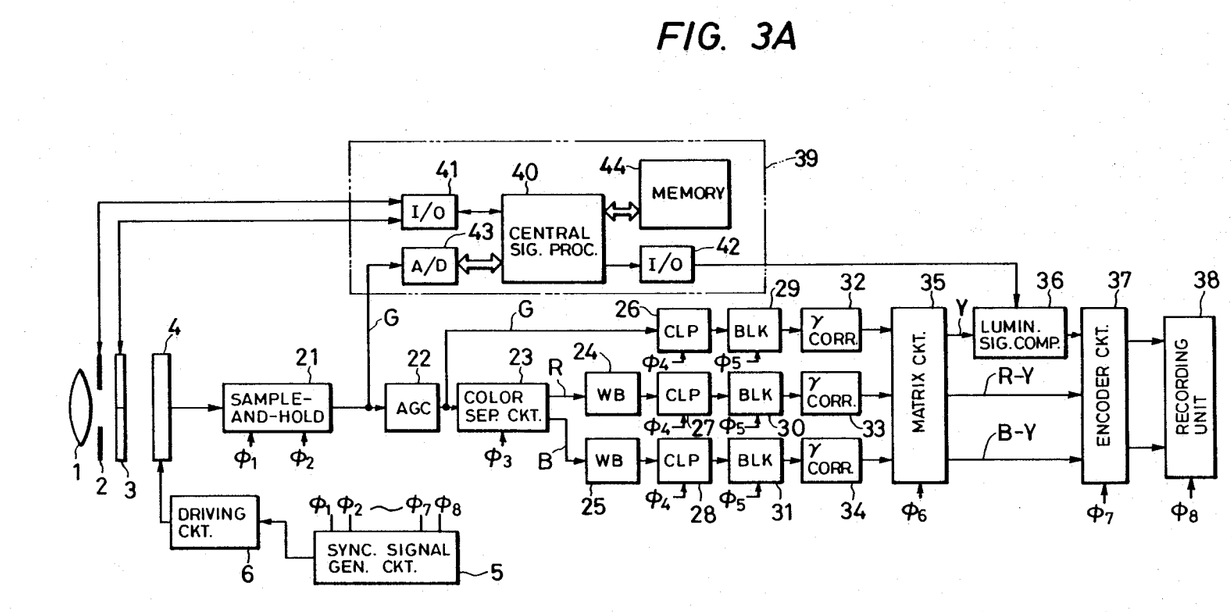
FIGS. 3A to 3C are block diagrams showing first to third embodiments of an electronic still camera according to the present invention.

FIG. 3A is a block diagram showing a preferred embodiment of an electronic still camera constructed in accordance with the present invention. In FIG. 3A, elements the same as or similar to those shown in FIG. 1 are designated by the same reference numerals.

The electronic still camera is composed of a photographing lens 1, an iris 2, a shutter 3, a solid-state image pickup element 4, a synchronizing signal generating circuit 5 which generates predetermined synchronizing signals 1 through 8, and a driving circuit 6. In this embodiment, color filters are provided for the image pickup element 4 so as to produce color signals for the primary colors, red (R), green (G) and blue (B). A signal separation/sample-and-hold circuit 21 receives an output signal from the image pickup element 4 at a timing established by a driving signal from the driving circuit 6. The circuit 21 performs signal separation of the signal fed from the image pickup element 4 to provide corresponding signals for the respective pixels. The separated signals are sampled and held by the sample-and-hold circuit 21.

An automatic gain control (AGC) circuit 22 is connected to the output of the circuit 21, and a color separation circuit 23 is connected to the output of the AGC circuit 22. The signals from the image pickup element 4 are sampled by the circuit 21 and amplified by the AGC circuit 22 to a certain amplitude so as to enable signal processing. The amplified signals are fed to a color separation circuit 23 where respective R and B color signals (or color signals of the complementary colors) are produced.

While balance adjusting circuits 24 and 25 are connected to the outputs of the color separation circuit 23. A clamping circuit 26 is connected to the output of the AGC circuit 22. Other clamping circuits 27 and 28 are connected to the white balance adjusting circuits 24 and 25, respectively. Blanking mixer circuits 29, 30 and 31 connected, respectively, to the clamping circuits 26, 27 and 28 to add blanking pulses for the blanking periods. Gamma ($\gamma$) correction circuits 32, 33 and 34 are connected to the outputs of the blanking mixer circuits 29, 30 and 31, respectively, in which the total amount of gamma ($\gamma$) of the camera system is corrected for each of the color signals R, G and B.

A matrix circuit 35 receives the G, R and B color signals outputted, respectively, from the gamma ($\gamma$) correction circuits 32, 33 and 34, and produces a luminance signal Y and color-difference signals R-Y and B-Y. A luminance signal compensating circuit 36 connected to one output of the matrix circuit 35 receives the luminance signal Y, in which the mu-factor that is, the amplification factor of the luminance signal Y, is set in accordance with the shutter speed (as described below in more detail).

An encoder circuit 37 receives the amplified luminance signal from the compensating circuit 36 and the color-difference signals R-Y and B-Y from the matrix circuit 35, on the basis of which a composite NTSC (or other system) color video signal is produced.

A recording unit 38 receives the video signal from the encoder circuit 37 and frequency-modulates it for recording on a magnetic recording medium.

In FIG. 3A, the portion within a dotted line is a controlling unit 39 for controlling the exposure level, which includes a central processing circuit 40 using, for example, a microcomputer or the like, input/output interface circuits 41 and 42, an analog-to-digital (A/D) converter 43, and a memory circuit 44. The A/D converter 43 converts the G color signal from the sample-and-hold circuit 21 to a digital signal, and the latter signal is supplied to the central processing circuit 40. Upon receipt of this signal from the A/D converter 48, the central processing circuit 40 detects the amount of light from the object entering the image pickup element 4 through the lens 1, iris 2 and the shutter 3. That is, the camera system according to this embodiment is provided with an internal light measuring system in which the amount of light received from the object is determined prior to actual photographing.

In the memory circuit 44, adjusting data are stored which are used to set optimum aperture setting and shutter speed values relative to the amount of light from the object. The central processing circuit 40 supplies adjusting data corresponding to the signal from the A/D converter 43 to a driving circuit (not shown) which sets the aperture setting with the iris 2 and the shutter speed through the input/output interface circuit 41. Thus, the aperture setting and the shutter speed are controlled so that a constant amount of light falls on the image pickup element 4.

The memory circuit 44 further stores preset luminance signal compensation data corresponding to the shutter speed. While controlling the iris 2 and the shutter 3 based on the adjusting data, the central processing circuit 40 supplies the luminance signal compensation data corresponding to the shutter speed to the luminance signal compensation circuit 36 through the input- /output interface circuit 42, so that the mu-factor is determined in accordance with the shutter speed. By carrying out such automatic adjustment of the mu-factor, the drop in the level of the output signal of the image pickup element when the shutter speed is increased is electrically compensated.

Figure 2C:
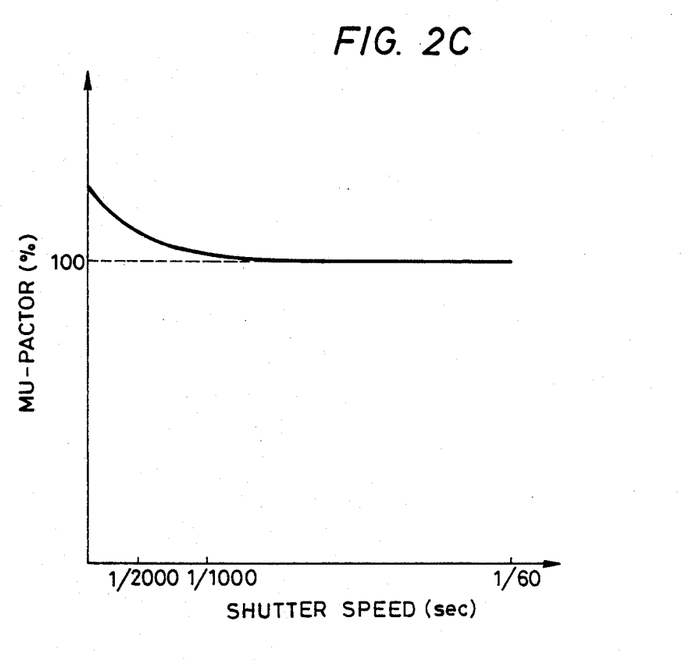
FIG. 2C depicts a characteristic curve of a luminance signal compensating circuit according to the present invention.

FIG. 2C is a graphical representation showing a mu-factor characteristic of the luminance signal compensation circuit 36 relative to shutter speed. The characteristic curve shown in FIG. 2C is substantially opposite to the curve shown in FIG. 2A, indicating that the output of the image pick-up element 4 is amplified with a larger mu-factor by the luminance signal compensating circuit 36 as the shutter speed becomes faster. In this manner, the drop in the amplitude level of the luminance signal is compensated for.

Figure 4:
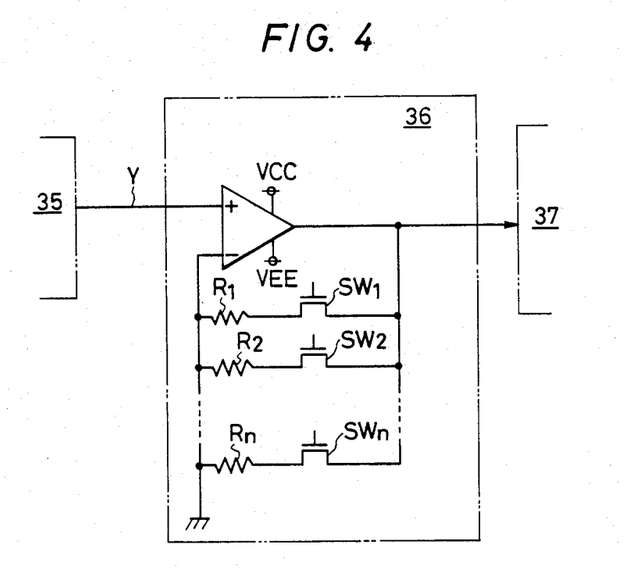
FIG. 4 is a circuit diagram showing an example of a luminance signal compensating circuit in FIG. 3A.

FIG. 4 is a circuit diagram showing an example of the luminance signal compensating circuit 36 in which an amplifier 36 is inserted in a luminance signal line connecting the matrix circuit 35 and the encoder circuit 37. Between the inverting input terminal of the amplifier 36 and the output thereof, a plurality of feedback resistors $R_1$ through $R_n$ are connected in parallel, each housing a different resistance. Each of a plurality of semiconductor switches $SW_1$ through $SW_n$ is connected in series in association with the respective feedback resistors $R_1$ through $R_n$. In response to the luminance signal compensation data from the central processing circuit 40, one or more than two semiconductor switches are selected and rendered conductive, thereby changing the resistivity of the feedback resistor. The mu-factor characteristic curve as shown in FIG. 2C is thus obtained.

As described, according to this embodiment, the drop in sensitivity of the image pickup element is compensated for by amplifying the luminance signal. Therefore, when the picture image is reproduced on a television monitor, an appropriate color gradation can be attained.

Next, a description will be given with respect to the correction of gamma changes in the image pickup element, which also occur when the shutter speed is increased, even if the exposure level of the image pickup element is maintained constant.

Figure 3B:
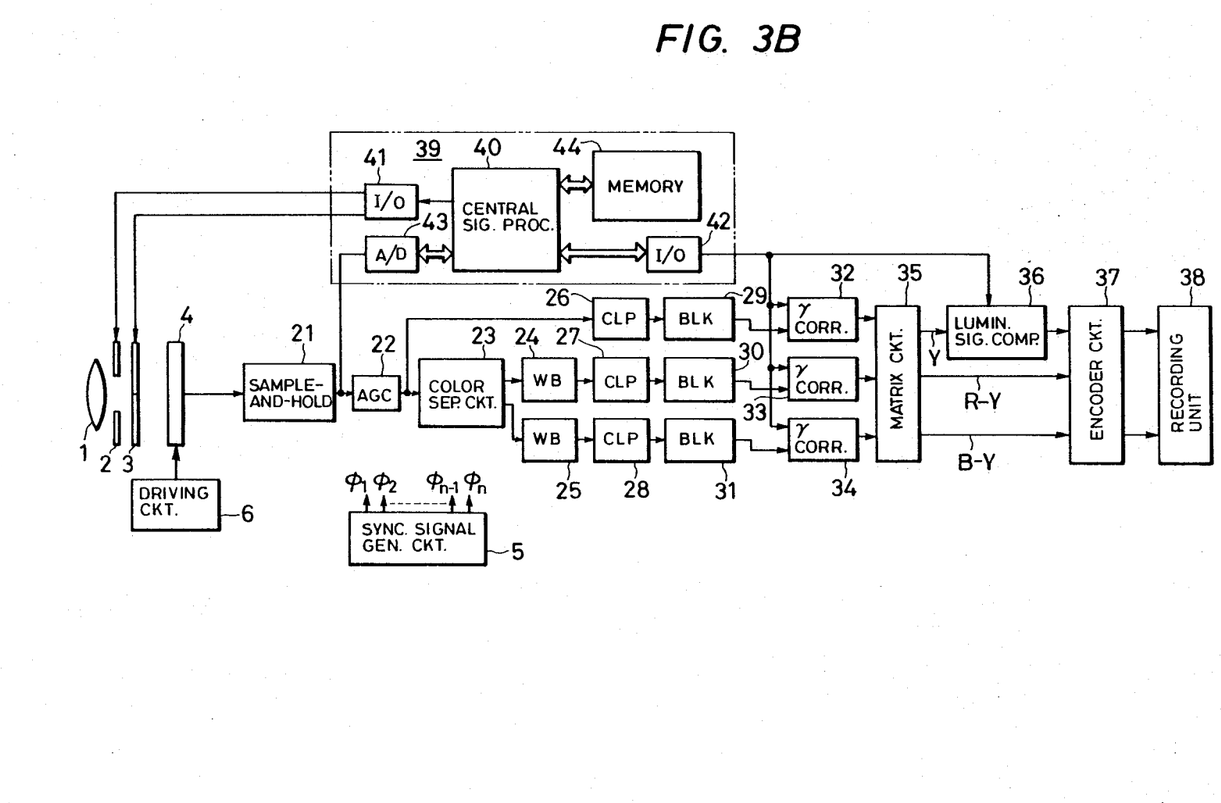

In FIG. 3B, the same elements are those shown in FIG. 3A are designated by the same reference numerals. Gamma correction data for controlling gamma correction values in the gamma correcting circuits 32, 33 and 34 in response to the shutter speed are stored in the memory circuit 44 in addition to the adjusting data for controlling the aperture setting and shutter speed and the correction values for the luminance signal compensating circuit 36.

Figure 5:
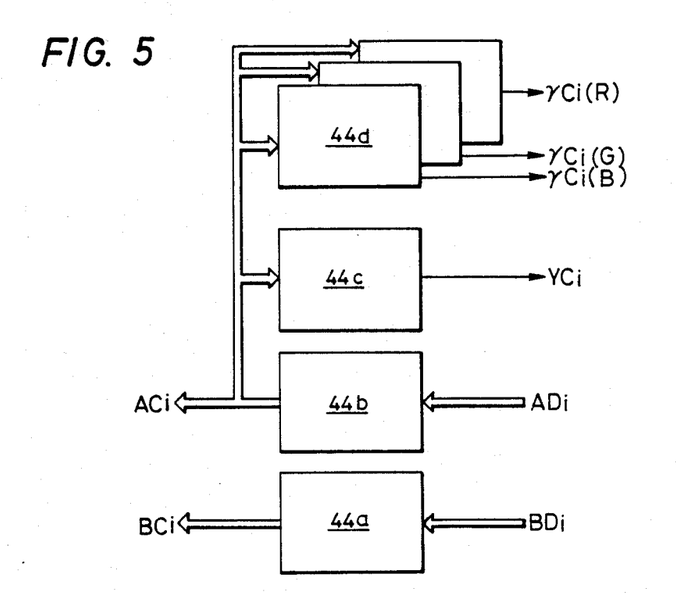
FIG. 5 is a block diagram showing the construction of a memory circuit in FIG. 3A.

The memory circuit 44 is constructed as shown in FIG. 5. In a region having addresses arranged corresponding to the amount of light measured, there are provided an adjusting data storage region 44a where aperture setting adjusting data are stored, and another adjusting data storage region 44b where shutter speed adjusting data are stored. Further, in an address region corresponding to the shutter speed being read out of the adjusting data storage region 44b, there are provided a storage region 44c where the luminance compensating data are stored, and another storage region 44d where gamma correcting data are stored.

When address signals ADi and BDi corresponding to the amount of light being measured are supplied from the central processing circuit 44 to the storage regions 44b and 44a, respectively, the adjusting data ACi and BCi are read from the storage regions 44b and 44a, respectively. The read-out data are transferred to set the iris 2 and the shutter 3 through the input/output interface circuit 41. The data ACi for determining the shutter speed is supplied to the storage regions 44c and 44d as an address signal. The luminance compensating data YCi is outputted from the storage region 44c, and the gamma correcting data $\gamma Ci(R)$, $\gamma Ci(G)$ and $\gamma Ci(B)$ are outputted from the storage region 44d. The data outputted from the storage regions 44c and 44d correspond to the shutter speed. The gamma correcting data $\gamma Ci(G)$, $\gamma Ci(R)$ and $\gamma Ci(B)$ are supplied to the gamma correcting circuits 32, 33 and 34, respectively. Accordingly, gamma correction is performed independently for the respective hues.

Figure 6:
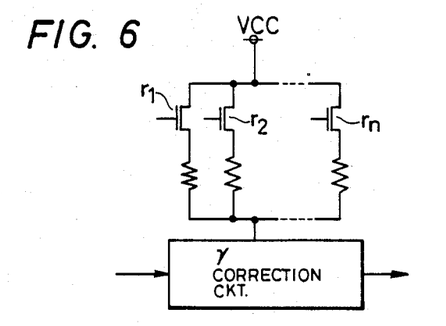
FIG. 6 is a circuit diagram showing the arrangement of a gamma correcting circuit in FIG. 3A.

The gamma correcting circuits 32, 33 and 34 are constructed so that their gains can be changed in a stepwise manner. An example of the gamma correcting circuit is shown in FIG. 6. As shown, a current from a current source is controlled by switching one or more than two semiconductor switches in accordance with the gamma correcting data. Thus, the gain adjusting current of the gamma correcting circuit is set to establish a gain which changes in a stepwise manner. By changing the gain in such a manner, the drop in level of the signals for the respective hues as the shutter speed is increased is compensated.

From a practical standpoint, luminance signal compensation may not need to be carried out when gamma correction is performed. Of course, if both are employed, highly precise correction is achieved.

Due to the gamma correction, the reproduced video image is not degraded. If, after carrying out gamma correction on the respective color signals, the luminance signal in the composite signal derived from the gamma-corrected color signals is compensated, highly precise compensation can be carried out, and therefore a very high quality image can be obtained having no influence due to shutter speed.

Another embodiment of the present invention will be described with reference to FIG. 3C in which elements which are the same as or similar to those shown in FIG. 3A are designated by the same reference numerals, and hence a further detailed description thereof will be omitted to avoid repetition.

Figure 3C:
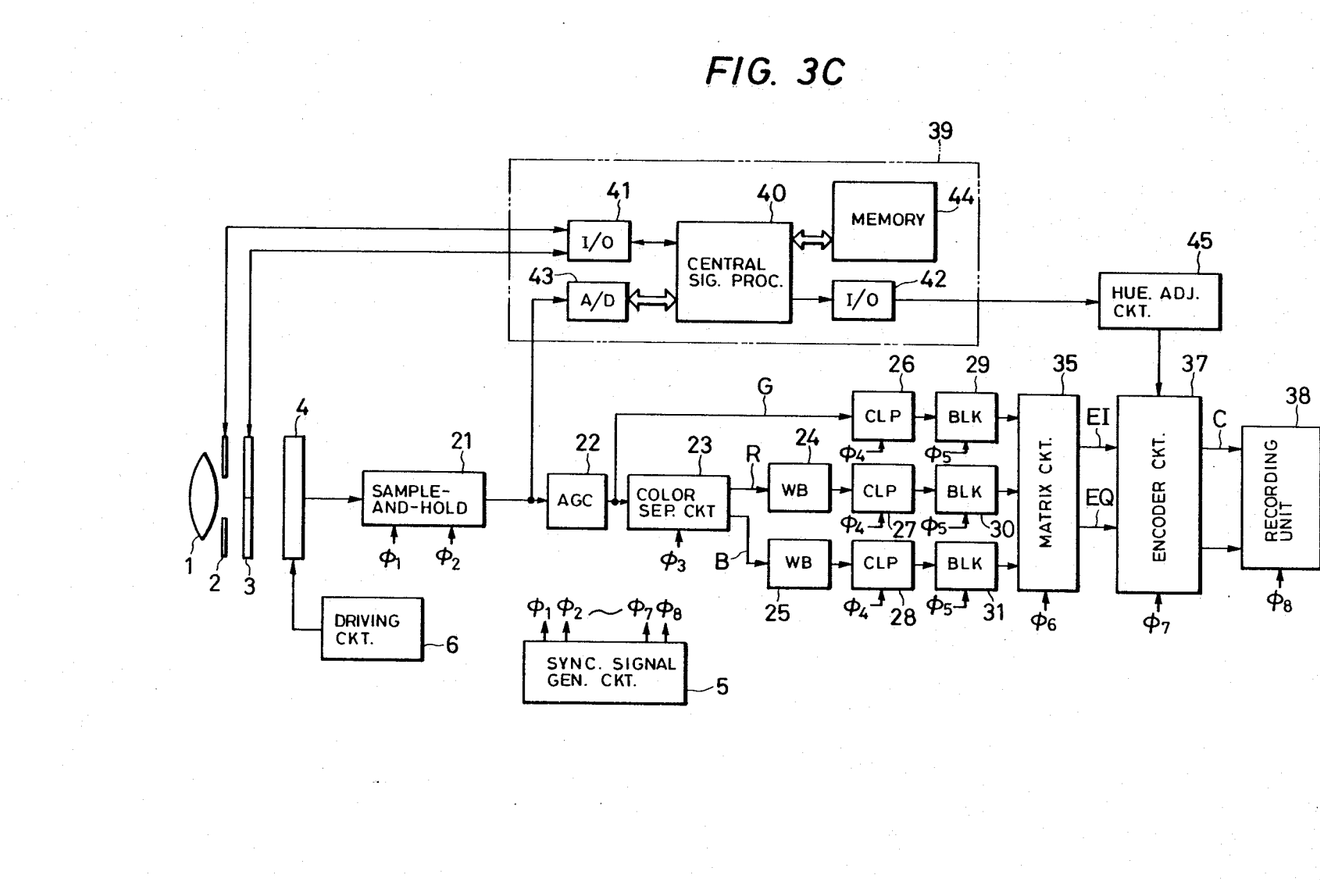

In the embodiment shown in FIG. 3C, the gamma correcting circuits 32, 33 and 34 used in the FIG. 3A embodiment are not provided. Instead, a hue adjusting circuit 45 is provided which is connected between the input/output circuit 42 and the encoder circuit 37. In the encoder circuit 37, color subcarriers delayed by 90 degrees with respect to each other are modulated by an I signal EI (or R-Y) and a Q signal EQ (or B-Y) at a predetermined frequency to produce a color carrier signal C. The encoder circuit 37 functions analogously to image transmission in the NTSC system. However, it differs therefrom in that the amplitudes of the I signal EI and the Q signal EQ are relatively changed by the output of the hue adjusting circuit 45, and the vector of the color carrier signal C, that is, the amplitude and the phase from the I-Q axis as a reference, are changed.

In the memory circuit 44, hue adjusting data is stored corresponding to the shutter speed, in addition to the adjusting data as described before. The hue adjusting data is used to change the relative amplitudes of the I signal EI and the Q signal EQ corresponding to the shutter speed. The hue adjusting data is supplied from the central processing circuit 40 to the hue adjusting circuit 45 through the input/output interface 42.

Figure 7:
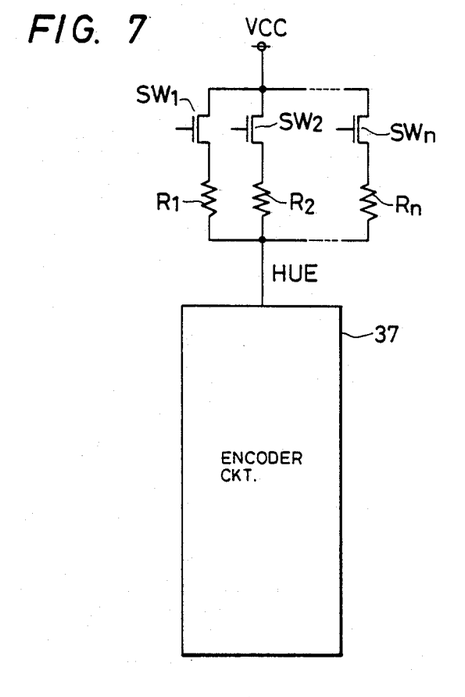
FIG. 7 is a circuit diagram showing the arrangement of a hue adjusting circuit in FIG. 3B.

The hue adjusting circuit 45 includes, as shown in FIG. 7, a plurality of resistors $R_1$ through $R_n$ and semiconductor switches $SW_1$ through $SW_n$. Particular semiconductor switches are selectively rendered conductive in response to the hue adjusting data, and the ratio of the relative amplitudes of the I signal EI and the Q signal EQ are changed by the voltage dividing ratio of the resistors $R_1$ through $R_n$ and a resistor (not shown) provided within the encoder circuit 37.

According to this embodiment, the changes in hues which occur when the shutter speed is increased are compensated for by adjusting the vector components of the color carrier signal when the latter signal is composed in the encoder circuit. Therefore, a reproduced picture image with precisely controlled hues can be obtained.

The above-described hue compensation can be carried out in conjunction with compensation for the drop in level of the output of the image pickup element by increasing the exposure level of the image pickup element by appropriately controlling the lens and the shutter.

Although a description has been given with respect to internal light measurement, external light measurement is also applicable to the present invention.

The exposure controlling unit 39 may be arranged so as to operate in a so-called EE mode in which both the aperture setting and the shutter speed are controlled for each light measurement. The inventive concept can also be applied to electronic still cameras employing either aperture priority or shutter priority.

In the described embodiments, while maintaining the exposure level of the image pickup element 4 at a constant value, the signal outputted from the image pickup element is compensated. However, the same effect can be attained by increasing the exposure level by controlling the aperture setting and the shutter speed, whereby the drop in sensitivity of the image pickup device which occurs as the shutter speed is increased is compensated. In such a case, the luminance signal compensating circuit 36 need not be provided in the embodiment shown in Figs. 3A and 3B, or the increment of the exposure level and compensation by the luminance compensation circuit 36 may be performed with an appropriate ratio. In the memory circuit 44, the stored adjusting data for the aperture setting and the shutter speed are set so as to increase the exposure level corresponding to the detected value at the time of light measurement. The drop in the sensitivity of the image pickup element can also be compensated for by adjusting the amount of exposure.

According to the above embodiments, since the drop in sensitivity of the image pickup element which occurs as the shutter speed is increased is well compensated, it is possible to obtain picture images of good gradation, even in the case where an image pickup element having a narrow dynamic range is employed, and thus an excellent electronic still camera can be provided. The present invention can be applied through not only to electronic still cameras but also to video cameras.

What is claimed:

1. A photographing method for a camera having an iris for setting an aperture setting value, a shutter, a solid-state image pickup for sensing an input image received by said pickup and for providing an output having an output level, and means for producing a video output signal in response to said output of said pickup, comprising the steps of:

determining when a shutter speed of said shutter exceeds a predetermined value; and compensating a drop in said output level of said pickup which occurs when said shutter speed exceeds said predetermined value so as to maintain a predetermined relationship between said image and said video output signal.

2. The photographing method of claim 1, wherein said step of compensating comprises controlling at least one of said iris and said shutter to increase the level of light received on said pickup.

3. A photographing method for a camera having an iris for setting an aperture setting value, a shutter, a solid-state image pickup for sensing an input image received by said pickup and for providing an output having an output level, and means for producing a video output signal in response to said output of said pickup, said method comprising the steps of:

determining when a shutter speed of said shutter exceeds a predetermined value; and compensating a drop in said output level of said pickup which occurs when said shutter speed exceeds said predetermined value so as to maintain a predetermined relationship between said image and said video output signal, wherein said step of compensating comprises compensating a gamma characteristic separately for each color in said video signal so as to maintain a constant relationship with respect to said image received on said pickup.

4. The photographing method of claim 3, wherein the colors contained in said video signal are the three primary colors, and wherein, in said step of compensating said gamma characteristic, a correction is effected for each color in an amount dependent upon said shutter speed.

5. The photographing method of claim 3, wherein the colors contained in said video signal are complements of the three primary colors, and wherein, in said step of compensating said gamma characteristic, a correction is effected of each color in an amount dependent upon said shutter speed.

6. The photographing method of claim 3, further comprising the step of producing a luminance signal in response to the gamma-corrected color signals, and amplifying said luminance signal with a gain determined in response to said shutter speed.

7. A photographing method for a camera having an iris for setting an aperture setting value, a shutter, a solid-state image pickup for sensing an input image received by said pickup and for providing an output having an output level, and means for producing a video output signal in response to said output of said pickup, said method comprising the steps of:

determining when a shutter speed of said shutter exceeds a predetermined value; and compensating a drop in said output level of said pickup which occurs when said shutter speed exceeds said predetermined value so as to maintain a predetermined relationship between said image and said video output signal, wherein said step of compensating comprises increasing an amplification factor of said video output signal in response to an amount of light received on said pickup.

8. A photographing method for a camera having an iris for setting an aperture setting value, a shutter, a solid-state image pickup for sensing an input image received by said pickup and for providing an output having an output level, and means for producing a video output signal in response to said output of said pickup, said video output signal including a color carrier signal modulated with image information, said method comprising the steps of:

determining when a shutter speed of said shutter exceeds a predetermined value; and compensating a drop in an output level of said pickup which occurs when said shutter speed exceeds said predetermined value so as to maintain a predetermined relationship between said image and said video output signal, wherein said step of compensating comprises adjusting an amplitude of said color carrier signal in response to said shutter speed.

9. A photographing method for a camera having an iris for setting an aperture setting value, a shutter, a solid-state image pickup for sensing an input image received by said pickup and for providing an output having an output level, and means for producing a video output signal in response to said output of said pickup, said method comprising the steps of:

determining when a shutter speed of said shutter exceeds a predetermined value; and compensating a drop in said output level of said pickup which occurs when said shutter speed exceeds said predetermined value so as to maintain a predetermined relationship between said image and said video output signal, wherein said step of compensating comprises maintaining a first relationship between said shutter speed and aperture value at shutter speeds below said predetermined value and maintaining a second relationship between said shutter speed and said aperture value at shutter speeds above said predetermined value.

* * * * *